(12) United States Patent
Karuppiah et al.

(10) Patent No.: US 10,754,868 B2
(45) Date of Patent: Aug. 25, 2020

(54) SYSTEM FOR ANALYZING THE RUNTIME IMPACT OF DATA FILES ON DATA EXTRACTION, TRANSFORMATION, AND LOADING JOBS

(71) Applicant: Bank of America Corporation, Charlotte, NC (US)

(72) Inventors: Kumaresan Karuppiah, Chennai (IN); Seshidhar R. Ammasani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 741 days.

(21) Appl. No.: 15/411,108

(22) Filed: Jan. 20, 2017

(65) Prior Publication Data
US 2018/0210931 A1    Jul. 26, 2018

(51) Int. Cl.
*G06F 17/00* (2019.01)
*G06F 7/00* (2006.01)
*G06F 16/25* (2019.01)

(52) U.S. Cl.
CPC ................ *G06F 16/254* (2019.01)

(58) Field of Classification Search
CPC .................................................. G06F 16/254
USPC ........................................................ 707/602
See application file for complete search history.

(56) References Cited

U.S. PATENT DOCUMENTS

| | | | |
|---|---|---|---|
| 5,481,721 A * | 1/1996 | Serlet | G06F 9/465 719/315 |
| 6,115,646 A * | 9/2000 | Fiszman | G06Q 10/10 700/104 |
| 6,208,345 B1 | 3/2001 | Sheard et al. | |
| 6,847,957 B1 * | 1/2005 | Morley | G06Q 10/10 706/47 |
| 7,373,350 B1 * | 5/2008 | Arone | G06F 16/25 707/E17.005 |
| 7,461,039 B1 | 12/2008 | Gilman | |
| 7,523,118 B2 | 4/2009 | Friedlander et al. | |
| 7,730,199 B2 * | 6/2010 | Song | G06F 16/24568 709/231 |
| 7,904,302 B2 | 3/2011 | Adendorff et al. | |
| 8,024,369 B2 | 9/2011 | Pellegrini et al. | |
| 8,041,760 B2 | 10/2011 | Mamou et al. | |
| 8,065,319 B2 * | 11/2011 | Ding | G06Q 10/06 707/769 |

(Continued)

*Primary Examiner* — Pavan Mamillapalli
(74) *Attorney, Agent, or Firm* — Michael A. Springs; Moore & Van Allen PLLC; Peter B. Stewart

(57) ABSTRACT

A system for analyzing the runtime impact of data files on data extraction, transformation, and loading (ETL) jobs typically includes a processor, a memory, and a runtime impact analysis module stored in the memory. The runtime impact analysis module is typically configured for: receiving a user input comprising a designator of a data repository from a user; receiving an ETL job list file from one or more ETL servers; for each ETL job invocation name in the ETL job list file: querying the one or more ETL servers for runtime information, receiving the runtime information from the one or more ETL servers, searching the runtime information for the designator of the data repository, and if the designator of the data repository is identified in the runtime information, adding the ETL job invocation name to an impacted ETL job file; and providing the impacted ETL job file to the user.

20 Claims, 5 Drawing Sheets

(56) References Cited

U.S. PATENT DOCUMENTS

| | | | |
|---|---|---|---|
| 8,082,349 B1 | 12/2011 | Bhargava et al. | |
| 8,112,383 B2 * | 2/2012 | Acheson | G06F 16/2438 |
| | | | 707/718 |
| 8,214,324 B2 | 7/2012 | Joerg et al. | |
| 8,214,799 B2 | 7/2012 | Haselden | |
| 8,219,518 B2 * | 7/2012 | Jin | G06F 8/20 |
| | | | 707/602 |
| 8,280,754 B2 | 10/2012 | Chowdhary et al. | |
| 8,402,547 B2 | 3/2013 | Wiegenstein et al. | |
| 8,577,833 B2 | 11/2013 | Erla et al. | |
| 8,650,150 B2 | 2/2014 | Zhao et al. | |
| 8,768,880 B2 | 7/2014 | Erla et al. | |
| 9,019,515 B2 * | 4/2015 | Takai | G03G 15/502 |
| | | | 358/1.13 |
| 9,195,470 B2 | 11/2015 | Adiki et al. | |
| 9,292,373 B2 | 3/2016 | Ereegovac et al. | |
| 9,361,137 B2 | 6/2016 | Behnen et al. | |
| 9,424,119 B2 | 8/2016 | Ereegovec et al. | |
| 9,449,060 B2 | 9/2016 | Dhayapule et al. | |
| 9,460,171 B2 | 10/2016 | Marrelli et al. | |
| 9,514,212 B2 | 12/2016 | Grasselt et al. | |
| 9,547,702 B2 | 1/2017 | Vilakkumadathil | |
| 10,394,637 B2 * | 8/2019 | Agarwal | G06F 16/254 |
| 2005/0187991 A1 * | 8/2005 | Wilms | G06F 11/1402 |
| | | | 707/999.204 |
| 2007/0074155 A1 | 3/2007 | Ama et al. | |
| 2007/0136324 A1 | 6/2007 | Xu et al. | |
| 2008/0162273 A1 | 7/2008 | Nguyen | |
| 2009/0240663 A1 | 9/2009 | Plattner et al. | |
| 2012/0102053 A1 | 4/2012 | Barrett et al. | |
| 2012/0254103 A1 * | 10/2012 | Cottle | G06F 16/254 |
| | | | 707/602 |
| 2013/0132139 A1 | 5/2013 | Yeung et al. | |
| 2013/0311423 A1 | 11/2013 | Price et al. | |
| 2015/0046389 A1 * | 2/2015 | Dhayapule | G06F 11/079 |
| | | | 707/602 |
| 2016/0196511 A1 | 7/2016 | Anisingaraju et al. | |
| 2016/0342666 A1 * | 11/2016 | Li | G06F 11/302 |
| 2017/0068582 A1 * | 3/2017 | Agarwal | G06F 11/079 |
| 2017/0075964 A1 | 3/2017 | Greene et al. | |
| 2017/0075966 A1 | 3/2017 | Greene et al. | |

\* cited by examiner

SYSTEM FOR ANALYZING THE RUNTIME IMPACT OF DATA FILES ON DATA EXTRACTION, TRANSFORMATION, AND LOADING JOBS

FIELD OF THE INVENTION

The present invention embraces a system for analyzing the runtime impact of data files on data extraction, transformation, and loading (ETL) jobs. The system is typically configured for: receiving a user input comprising a designator of a data repository from a user; receiving an ETL job list file from one or more ETL servers; for each ETL job invocation name in the ETL job list file: querying the one or more ETL servers for runtime information, receiving the runtime information from the one or more ETL servers, searching the runtime information for the designator of the data repository, and if the designator of the data repository is identified in the runtime information, adding the ETL job invocation name to an impacted ETL job file; and providing the impacted ETL job file to the user.

BACKGROUND

Extract, transform, and load (ETL) refers to a process in data warehousing in which data from source systems are loaded into a data warehouse. The extracting step involves extracting data of interest from source systems so the data can be further processed. The transforming step typically involves converting data into a standardized format and validating the data. The transforming step may also involve aggregating data. The loading step involves loading the transformed data into a target system (e.g., into a target database).

SUMMARY

In one aspect, the present invention embraces a computerized system, and an associated method and computer program product, for analyzing the runtime impact of data files on data extraction, transformation, and loading (ETL) jobs. The system typically includes a processor and a memory. The system also typically includes a runtime impact analysis module stored in the memory and executable by the processor. In one embodiment, the runtime impact analysis module is configured for: receiving user input from a user, the user input comprising a designator of a data repository; querying one or more ETL servers for an ETL job list; receiving an ETL job list file from the one or more ETL servers, wherein the ETL job list file comprises a list of a plurality of ETL job invocation names; for each ETL job invocation name in the ETL job list file: (1) querying the one or more ETL servers for runtime information related to the ETL job invocation name; (2) receiving the runtime information related to the ETL job invocation name from the one or more ETL servers; (3) searching the runtime information related to the ETL job invocation name for the designator of the data repository; and (4) if the designator of the data repository is identified in the runtime information, adding the ETL job invocation name to an impacted ETL job file; and providing the impacted ETL job file to the user.

In a first particular embodiment, the runtime impact analysis module is configured for: determining whether the user input is valid; and querying the one or more ETL servers for the ETL job list in response to determining that the user input is valid.

In a second particular embodiment, either alone or in combination with the other particular embodiments, the ETL job list file received from the one or more ETL servers lists a plurality of ETL jobs; and the runtime impact analysis module is configured for: determining whether each ETL job listed in the ETL job list file is valid; and for each ETL job determined to be invalid, remove the ETL job from the ETL job list file.

In a first aspect of the second particular embodiment, determining whether each ETL job listed in the ETL job list file is valid may comprise: querying the one or more ETL servers for job status information related to each ETL job listed in the ETL job list file; receiving the job status information; and based on the job status information, determining whether each ETL job listed in the ETL job list file is valid.

In a second aspect of the second particular embodiment, the runtime impact analysis module may be configured for: determining whether each ETL job listed in the ETL job list file has multiple invocations; and for each ETL job listed in the ETL job list file that has multiple invocations, listing each invocation of the ETL job in the ETL job list file thereby creating the list of the plurality of ETL job invocation names. For each ETL job listed in the ETL job list file that has multiple invocations, listing each invocation of the ETL job in the ETL job list file may comprise replacing a name of the ETL job with a name of each invocation of the ETL job. The list of the plurality of ETL job invocation names may comprise: for each ETL job listed in the ETL job list file that has multiple invocations, a name of each invocation of the ETL job; and for each ETL job listed in the ETL job list file that does not have multiple invocations, a name of the ETL job.

In a third particular embodiment, the user input comprises a name of an ETL project; and each ETL job invocation name in the ETL job list file is related to the ETL project.

In a fourth particular embodiment, the data repository is a data file.

In a fifth particular embodiment, the data repository is a data table.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
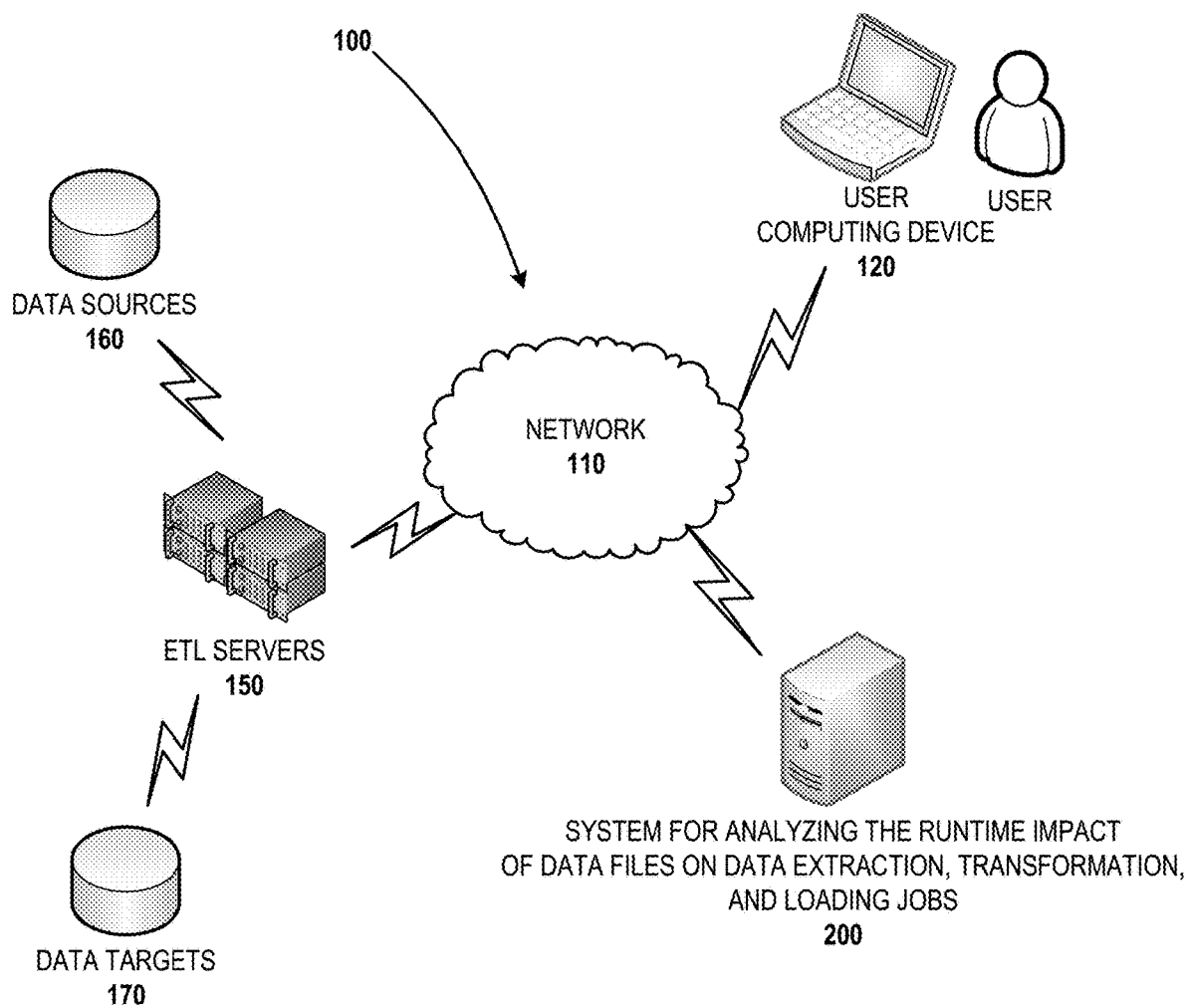
Figure 2:
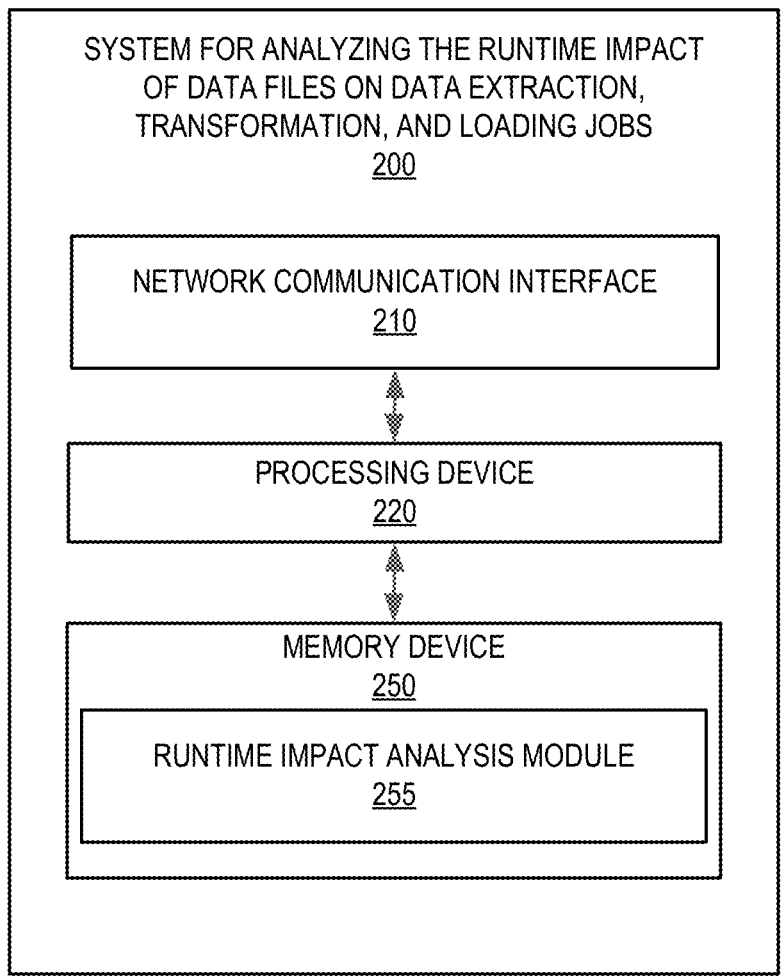

Having thus described embodiments of the invention in general terms, reference will now be made the accompanying drawings, wherein:

FIG. 1 depicts an operating environment in accordance with an aspect of the present invention;

FIG. 2 schematically depicts a system for analyzing the runtime impact of data files on data extraction, transformation, and loading (ETL) jobs in accordance with an aspect of the present invention.

Figure 3A:
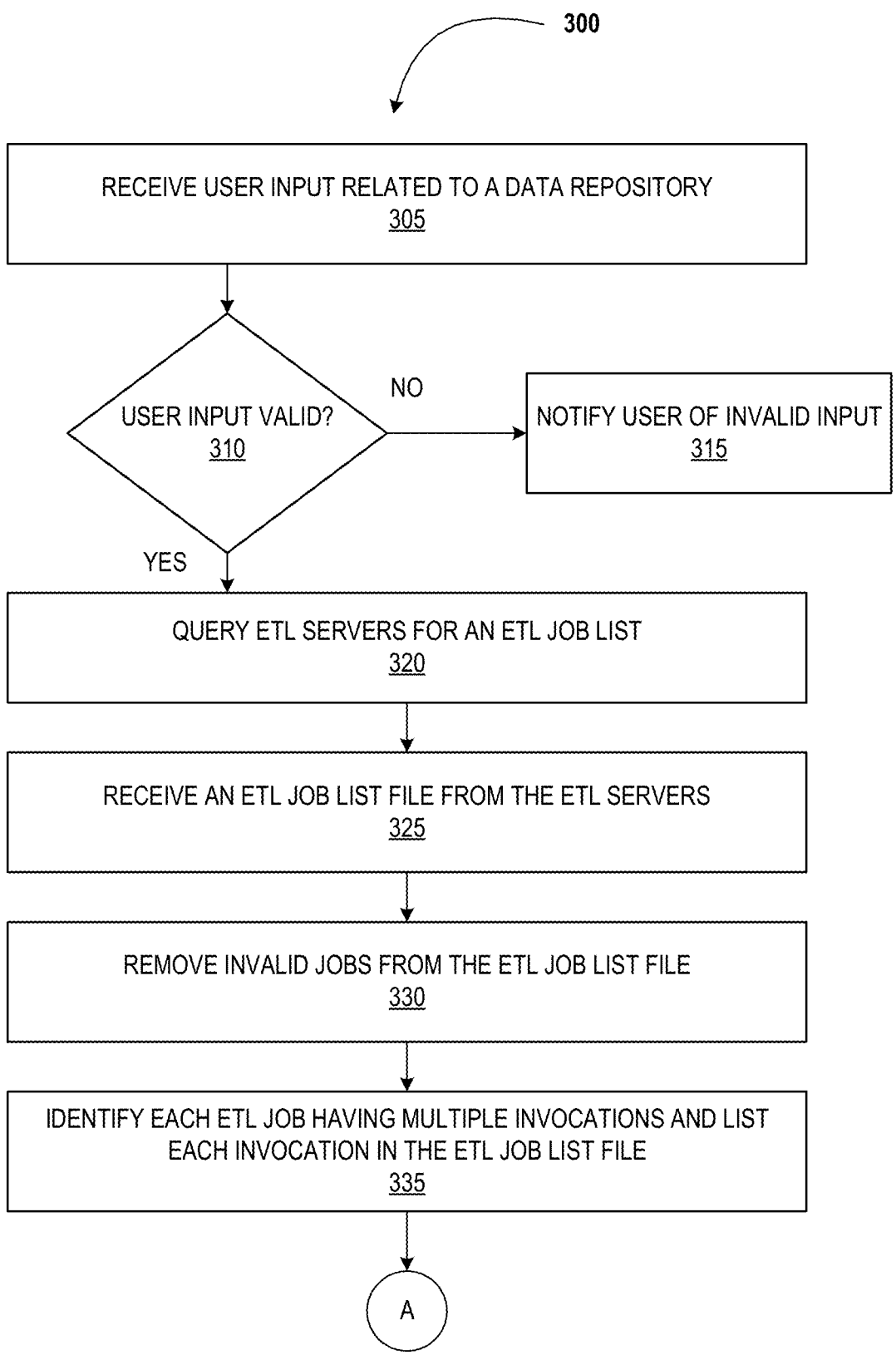
Figure 3B:
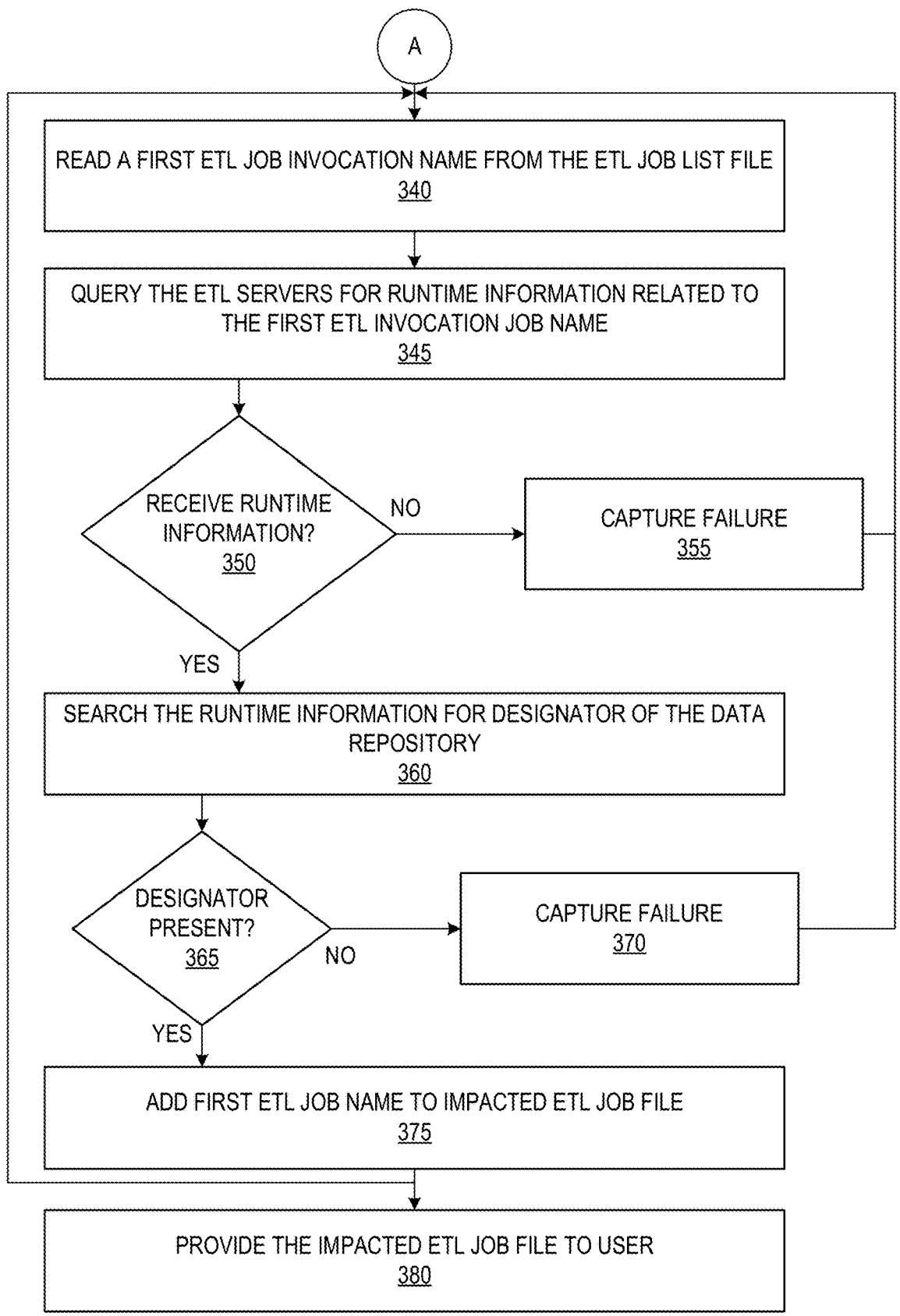
Figure 4:
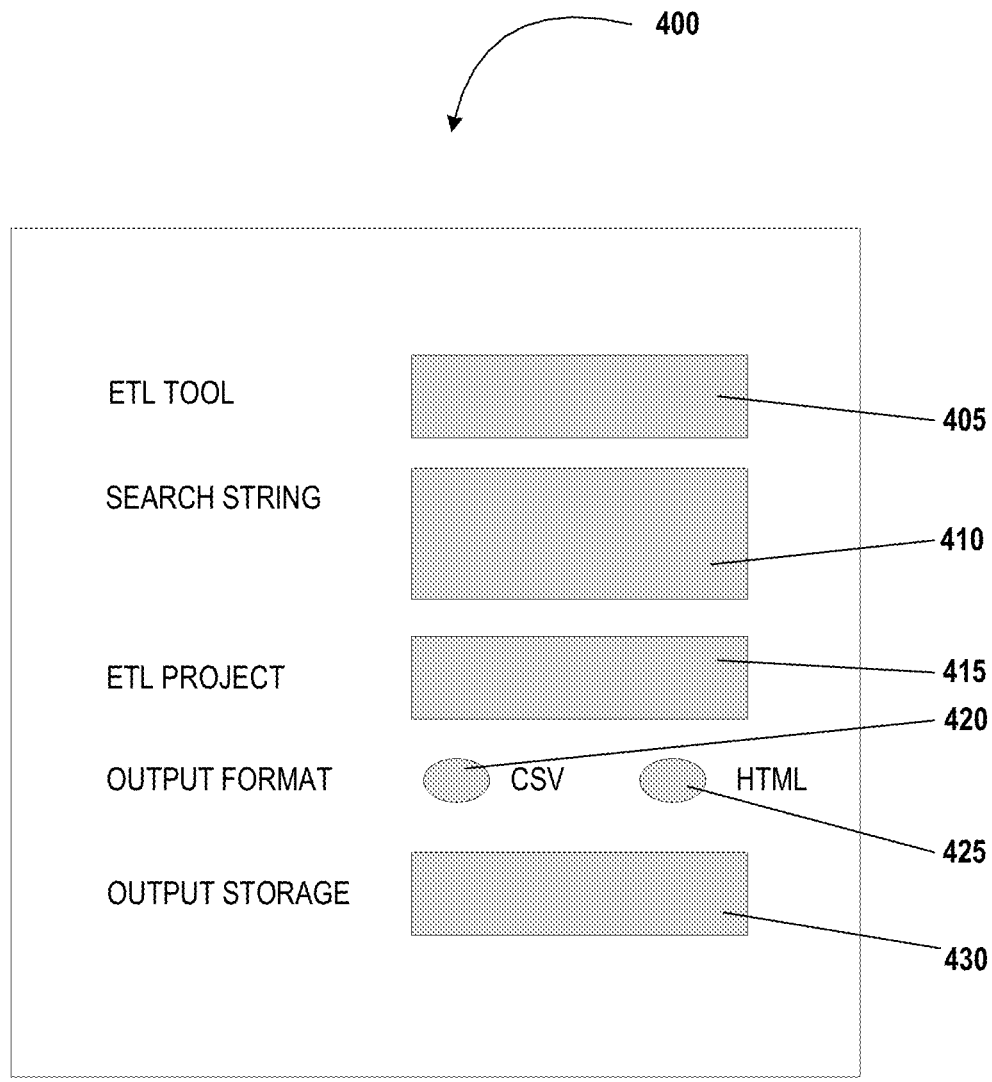

FIGS. 3A-3B depict a method for analyzing the runtime impact of data files on data extraction, transformation, and loading (ETL) jobs in accordance with an aspect of the present invention; and FIG. 4 depicts an exemplary graphical user interface in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for analyzing the runtime impact of data files on data extraction, transformation, and loading (ETL) jobs described herein. A "user" may be any person or entity using a system for analyzing the runtime impact of data files on data extraction, transformation, and loading (ETL) jobs described herein. Often, a user is an employee of the entity.

Extract, transform, and load (ETL) refers to a process in data warehousing in which data from source systems are loaded into a data warehouse. The extracting step involves extracting data of interest from source systems so the data can be further processed. The transforming step typically involves converting data into a standardized format and validating the data. The transforming step may also involve aggregating data. The loading step involves loading the transformed data into a target system (e.g., into a target database). One or more ETL servers are typically employed by an entity to provide ETL processing. In ETL processing, an ETL job is defined series of steps in which data from a particular data source is extracted, transformed, and loaded into a target system. An ETL project is a series of related ETL jobs and components (e.g., engines, connectors, data repositories, and the like) used in such jobs. As used herein, a data repository may be any collection of data (e.g., a data file or a data table) that is used during an ETL job. For example, a data repository used in a particular ETL job may be a source data file from which data is extracted or a target database to which transformed data is loaded.

In managing ETL processing, it may be desirable to identify those ETL jobs that are using a particular data repository during runtime (i.e., during the processing/execution of those ETL jobs). However, existing ETL software tools do not provide the functionality to identify those ETL jobs that are using a particular data repository during runtime. Moreover, it is impracticable, if not impossible, to manually review information about each ETL job to then ascertain which ETL jobs are using a particular data repository. Therefore, Applicant has identified that a need exists for a system that can easily identify those ETL jobs that are using a particular data repository during runtime.

Therefore, in one aspect, the present invention is directed to a system for analyzing the runtime impact of data files on data extraction, transformation, and loading (ETL) jobs. In particular, the system typically allows a user to specify a particular data repository (e.g., a data file or a data table) for which the user wants runtime information. Next, the system queries an ETL server for a list of ETL jobs. Using the list of ETL jobs, the system then queries the ETL server for runtime information related to each ETL job. This runtime information is then searched by the system to determine whether the name of data repository appears. The system then provides the user with a list of those ETL jobs where the name of the data repository appeared in the runtime information corresponding to such ETL jobs.

FIG. 1 provides a block diagram illustrating an operating environment 100, in accordance with an embodiment of the present invention. As illustrated in FIG. 1, the operating environment 100 typically includes one or more ETL servers 150. The one or more ETL servers 150 are typically in communication with one or more data sources 160 and one or more data targets 170. The one or more ETL servers 150 are typically configured to perform ETL processing (e.g., extracting data from the data sources 160, transforming the data, and loading the data in the data targets 170).

The operating environment 100 also typically includes a system 200 for analyzing the runtime impact of data files on data extraction, transformation, and loading (ETL) jobs. The system 200 and the one or more ETL servers 150 are typically in communication with a network 110, such as the Internet, wide area network, local area network, Bluetooth network, near field network, or any other form of contact or contactless network. One or more users, each having a user computing device 120, such as a PC, laptop, mobile phone, tablet, television, mobile device, or the like, may be in communication with the ETL servers 150 and the system 200 via the network 110.

FIG. 2 depicts the system for analyzing the runtime impact of data files on data extraction, transformation, and loading (ETL) jobs 200 in more detail. As depicted in FIG. 2, the system 200 typically includes various features such as a network communication interface 210, a processing device 220, and a memory device 250. The network communication interface 210 includes a device that allows the system 200 to communicate with the one or more ETL servers 150 and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system 200 is configured to analyze the runtime impact of data files on ETL jobs being processed by the one or more ETL servers 150. Accordingly, the system 200 typically includes one or more modules stored in the memory device 250, which facilitate such analysis. As depicted in FIG. 2, the system 200 typically may include a runtime impact analysis module 255 configured to perform such analysis.

Referring now to FIGS. 3A-3B, a method 300 is provided for analyzing the runtime impact of data files on data extraction, transformation, and loading (ETL) jobs. This method 300 may be performed by the system 200.

At block 305, the method includes receiving (e.g., by the system 200) a user input related to a data repository (e.g., a particular data file or a data table) for which a user is interested in identifying those ETL jobs that are using such data repository during runtime. In this regard, the user input typically identifies the data repository, such as by including a filename or other designator that can be used to identify the data repository. The user input may specify a particular ETL project (e.g., by the user providing the name of the particular ETL project). If the user input specifies a particular ETL project, then the system 200 will typically only analyze runtime information related to that particular ETL project. That said, if the user input does not specify a particular ETL project, then the system 200 will typically not limit its analysis of runtime information to any particular ETL project. The user input may specify a particular ETL tool. If the user input specifies a particular ETL tool, then the system 200 will typically only analyze runtime information related to ETL projects being managed by such ETL tool. The user input may also specify how the system 200 should provide its results to the user. For example, the user input may specify a particular output format for the results. In addition, the user input may specify a file in which the results should be stored and/or an email address to which the results should be transmitted.

The system 200 typically receives the user input from a user computing device 120. In some embodiments, the user computing device 120 may be configured to display a graphical user interface (GUI) through which the user may provide the user input to the system 200. The user computing device 120 may display the graphical user interface in response to receiving a command from the system 200 (e.g., a command configured to cause the computing device 120 to display the graphical user interface). An exemplary graphical user interface 400 is depicted in FIG. 4. As depicted in FIG. 4, the graphical user interface 400 may include a field 405 in which the user may specify a particular ETL tool (e.g., by typing in the name of the ETL tool and/or by selecting the ETL tool via a drop down menu). In the field 410, the user may provide a designator (e.g., filename) of the data repository for which the user is interested in identifying those ETL jobs that are using such data repository during runtime. The graphical user interface 400 may be configured to allow the user to specify a particular ETL project in field 415. The graphical user interface 400 may include one or more selectable buttons 420 and 425 or fields in which the user may specify a format in which the system will provide the results. FIG. 4 depicts the graphical user interface 400 providing the user with the option of selecting CSV or HTML formats for the results provided by the system 200. The graphical user interface 400 may also include a field 430 in which the user may specify where the system 200 sends the results. For example, the user may specify (i) an email address to which results will be sent by the system 200 and/or (ii) a filename and location of a file in which the results will be stored by the system 200.

Returning to FIG. 3A, at block 310, the system 200 determines whether the user input is valid. In this regard, the system 200 may apply defined rules to validate the user input. For example, the system 200 may determine whether (i) the data repository specified by the user matches an existing data repository and (ii) the ETL project specified by the user matches an existing ETL project. The system 200 may determine whether the user has specified a valid email address or filename for outputting results.

If any of the user input is invalid, then at block 315, the system 200 typically notifies the user that such input is invalid. For example, the system 200 may cause the graphical user interface 400 to display a corresponding error message. Alternatively, the system may send an error message to an email address provided by the user.

However, if the user input is valid, then at block 320, the system 200 typically queries one or more ETL servers (e.g., the ETL servers 150) for an ETL job list. If the user input specified a particular ETL project, then the query is typically limited to ETL jobs related to such project. However, if the user input does not specify a particular ETL project, then the query typically covers all ETL jobs such ETL servers are configured to process.

At block 325, in response to querying the ETL servers, the system 200 typically receives an ETL job list file from the ETL servers. This file typically includes a list of ETL job names. As previously noted, if the user input specified a particular ETL project, then these names typically correspond to ETL jobs related to such ETL project. However, if the user did not specify a particular ETL job, then these names typically correspond to all ETL jobs the ETL servers are configured to process.

Next, at block 330, the system 200 typically removes invalid jobs from the ETL job list file. In this regard, the system 200 may query the ETL servers for job status information related to each ETL job name in the ETL job list file and, based on the job status information received from the ETL servers, ascertain whether each job is valid. For example, the job status information may indicate that a particular job is no longer is use or has not been implemented properly, and, based on this information, the system 200 may determine the particular job is invalid. For each job that the system 200 determines is invalid, the system 200 removes such job from the ETL job list file.

At block 335, the system typically identifies each ETL job remaining in the ETL job list file that has multiple invocations. In this regard, the ETL servers may invoke a particular ETL job multiple times. For example, a particular ETL job may relate to transaction processing. The ETL servers may separately invoke this ETL job for each country for which the ETL servers wish to perform such transaction processing. In order to determine whether a particular ETL job has multiple invocations, the system 200 typically queries the ETL servers for information about the particular ETL job (e.g., "last run information"). Based on this information, the system 200 is then able to determine whether such ETL job has multiple invocations. If a particular ETL job has multiple invocations, then the system 200 will typically replace the ETL job name corresponding to ETL job with an ETL job invocation name of each invocation of such ETL job. For example, if the system 200 determines that an ETL job with the name "FIRST_JOB" has two invocations "INVOCATION1" and "INVOCATION2," the name "FIRST_JOB" in the ETL job list file may be replaced with the ETL job invocation names "FIRST_JOB. INVOCATION1" and "FIRST_JOB. INVOCATION2." That said, if the system 200 determines that another ETL job does not have multiple invocations, then the system 200 will typically not alter the name of such ETL job in the ETL job list file. As used herein, an "ETL job invocation name" refers to: (1) the name of each specific invocation of an ETL job having multiple invocations (e.g., "FIRST_JOB. INVOCATION1") and (2) the name of an ETL job that does not have multiple invocations (e.g., "SECOND_JOB"). Thus, the ETL job list file now includes a list of ETL job invocation names.

Next, at block 340 in FIG. 3B, the system 200 reads a first ETL job invocation name from the ETL job list file. As noted above, the first ETL job invocation name is either (1) the name of a specific invocation of an ETL job invoked multiple times or (2) the name of an ETL job having a single invocation.

At block 345, the system 200 queries the ETL servers for runtime information related to the first ETL job invocation name. This query typically includes the first ETL invocation job name. In response to querying the ETL servers, the system 200 typically receives runtime information related to the ETL job corresponding to the first ETL job name. The system 200 will then typically store the runtime information for further analysis, such as in a temporary file.

At block 350, the system 200 determines whether it has received the runtime information related to the first ETL job invocation name from the ETL servers.

If the system 200 determines that it has not received the runtime information related to the first ETL job invocation name (e.g., due to a processing error experienced by the ETL servers), then at block 355, the system 200 will typically capture this failure to receive the runtime information. In one embodiment, the system 200 will add the first ETL job invocation name to a file containing a list of ETL job invocation names in which there was a processing error or other failure. If the ETL servers provide any information to the system 200 regarding errors experienced by the ETL servers in processing the query, this error information may be included in such file.

If the system 200 determines that it has received the runtime information related to the first ETL job invocation name, then at block 360, the system will typically search the runtime information for the designator (e.g., table name or filename) of the data repository provided by the user.

At block 365, the system 200 determines whether the designator of the data repository is located in the runtime information related to the first ETL job invocation name. In this regard, the system 200 may search the runtime information to determine if it contains a text corresponding to the designator of the data repository.

If the system 200 fails to locate the designator of the data repository in the runtime information related to the first ETL job name, then at block 370, the system will typically capture this failure. In one embodiment, the system 200 will add the first ETL job invocation name to a file containing a list of ETL job names whose runtime information does not contain the designator of the data repository.

If the system 200 locates the designator of the data repository in the runtime information related to the first ETL job invocation name, then at block 375, the system will typically add the first ETL job invocation name to an impacted ETL job file. Once the system 200 either (i) adds the first ETL job invocation name to the impacted ETL job file at block 375, (ii) captures the failure to locate the designator of the data repository in the runtime information related to the first ETL job invocation name at block 370, or (iii) captures the failure to receive the runtime information related to the first ETL job invocation name at block 355, then the system 200 typically repeats the steps set forth in blocks 340-375 for each of the remaining ETL job invocation names contained in the ETL job list file.

After these steps (i.e., the steps corresponding to blocks 340-375) have been performed for each ETL job invocation name contained in the ETL job list file, then at block 380, the system 200 provides the impacted ETL job file to the user. Because the above steps have been repeated for all of the ETL job invocation names contained in the ETL job list file, the impacted ETL job file contains a list of all ETL job invocations listed in the ETL job list file that use the data repository during runtime. The impacted ETL job file may be provided to the user by sending the impacted ETL job file to an email address previously specified by the user (e.g., contained in the user input) and/or by saving the impacted ETL job file using a filename and file location previously specified by the user (e.g., contained in the user input).

As evident from the preceding description, the system described herein represents an improvement in technology by analyzing the runtime impact of data repositories on ETL jobs in order to identify those ETL jobs that are using a particular data repository during runtime. One of the problems associated with identifying ETL jobs that are using a particular data repository during runtime is that ETL servers typically provide runtime information separately for each invocation of an ETL job. Thus, in order to query the ETL servers for such runtime information, the name of each invocation of each ETL job is typically needed. However, it is typically not possible to simply query the ETL servers for list of all valid ETL job invocations. Therefore, the present system first typically queries the ETL servers for a "raw" list of ETL jobs (e.g., at block 325). Next, the system removes invalid jobs from the "raw" list (e.g., at block 330), thereby reducing subsequent processing requirements (e.g., processing power, memory, and the like) that the system uses in analyzing the runtime information related to ETL job invocations. The system then further processes the list to ensure that each invocation of each ETL job is included in the list (e.g., at block 335). Thereafter, the system is able to query the ETL servers for runtime information related to each invocation and analyze the runtime information to identify those ETL jobs that are using the particular data repository during runtime (e.g., at blocks 340-375). Accordingly, the system provides a technical solution for overcoming the problem of how to interact with and process information from ETL servers in order to identify those ETL jobs that are using a particular data repository during runtime As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for analyzing the runtime impact of data files on data extraction, transformation, and loading (ETL) jobs, comprising:
   a computer apparatus including a processor and a memory; and
   a runtime impact analysis module stored in the memory, executable by the processor and configured for:
      receiving user input from a user, the user input comprising a designator of a data repository;
      querying one or more ETL servers for an ETL job list;
      receiving an ETL job list file from the one or more ETL servers, wherein the ETL job list file comprises a list of a plurality of ETL job invocation names, wherein the ETL job list file received from the one or more ETL servers lists a plurality of ETL jobs;
      determining whether each ETL job listed in the ETL job list file is valid;
      for each ETL job determined to be invalid, removing the ETL job from the ETL job list file;
      determining whether each ETL job listed in the ETL job list file has multiple invocations;

for each ETL job listed in the ETL job list file that has multiple invocations, listing each invocation of the ETL job in the ETL job list file thereby creating the list of the plurality of ETL job invocation names;

for each ETL job invocation name in the ETL job list file:
querying the one or more ETL servers for runtime information related to the ETL job invocation name;
receiving the runtime information related to the ETL job invocation name from the one or more ETL servers;
searching the runtime information related to the ETL job invocation name for the designator of the data repository received from the user; and
if the designator of the data repository is identified in the runtime information, adding the ETL job invocation name to an impacted ETL job file; and providing the impacted ETL job file to the user, wherein the impacted ETL job file comprises a list of all ETL job invocations from the ETL job list file that use, during runtime, the data repository received from the user.

2. The system according to claim 1, wherein the runtime impact analysis module is configured for:
determining whether the user input is valid; and
querying the one or more ETL servers for the ETL job list in response to determining that the user input is valid.

3. The system according to claim 1, wherein determining whether each ETL job listed in the ETL job list file is valid comprises:
querying the one or more ETL servers for job status information related to each ETL job listed in the ETL job list file;
receiving the job status information; and
based on the job status information, determining whether each ETL job listed in the ETL job list file is valid.

4. The system according to claim 1, wherein, for each ETL job listed in the ETL job list file that has multiple invocations, listing each invocation of the ETL job in the ETL job list file comprises replacing a name of the ETL job with a name of each invocation of the ETL job.

5. The system according to claim 1, wherein the list of the plurality of ETL job invocation names comprises:
for each ETL job listed in the ETL job list file that has multiple invocations, a name of each invocation of the ETL job; and
for each ETL job listed in the ETL job list file that does not have multiple invocations, a name of the ETL job.

6. The system according to claim 1, wherein:
the user input comprises a name of an ETL project; and
each ETL job invocation name in the ETL job list file is related to the ETL project.

7. The system according to claim 1, wherein the data repository is a data file.

8. The system according to claim 1, wherein the data repository is a data table.

9. A computer program product for analyzing the runtime impact of data files on data extraction, transformation, and loading (ETL) jobs, comprising a non-transitory computer-readable storage medium having computer-executable instructions for:
receiving user input from a user, the user input comprising a designator of a data repository;
querying one or more ETL servers for an ETL job list;
receiving an ETL job list file from the one or more ETL servers, wherein the ETL job list file comprises a list of a plurality of ETL job invocation names, wherein the ETL job list file received from the one or more ETL servers lists a plurality of ETL jobs;
determining whether each ETL job listed in the ETL job list file is valid;
for each ETL job determined to be invalid, removing the ETL job from the ETL job list file;
determining whether each ETL job listed in the ETL job list file has multiple invocations;
for each ETL job listed in the ETL job list file that has multiple invocations, listing each invocation of the ETL job in the ETL job list file thereby creating the list of the plurality of ETL job invocation names;
for each ETL job invocation name in the ETL job list file:
querying the one or more ETL servers for runtime information related to the ETL job invocation name;
receiving the runtime information related to the ETL job invocation name from the one or more ETL servers;
searching the runtime information related to the ETL job invocation name for the designator of the data repository received from the user; and
if the designator of the data repository is identified in the runtime information, adding the ETL job invocation name to an impacted ETL job file; and
providing the impacted ETL job file to the user, wherein the impacted ETL job file comprises a list of all ETL job invocations from the ETL job list file that use, during runtime, the data repository received from the user.

10. The computer program product according to claim 9, wherein the non-transitory computer-readable storage medium has computer-executable instructions for:
determining whether the user input is valid; and
querying the one or more ETL servers for the ETL job list in response to determining that the user input is valid.

11. The computer program product according to claim 9, wherein determining whether each ETL job listed in the ETL job list file is valid comprises:
querying the one or more ETL servers for job status information related to each ETL job listed in the ETL job list file;
receiving the job status information; and
based on the job status information, determining whether each ETL job listed in the ETL job list file is valid.

12. The computer program product according to claim 9, wherein, for each ETL job listed in the ETL job list file that has multiple invocations, listing each invocation of the ETL job in the ETL job list file comprises replacing a name of the ETL job with a name of each invocation of the ETL job.

13. The computer program product according to claim 9, wherein the list of the plurality of ETL job invocation names comprises:
for each ETL job listed in the ETL job list file that has multiple invocations, a name of each invocation of the ETL job; and
for each ETL job listed in the ETL job list file that does not have multiple invocations, a name of the ETL job.

14. The computer program product according to claim 9, wherein:
the user input comprises a name of an ETL project; and
each ETL job invocation name in the ETL job list file is related to the ETL project.

15. The computer program product according to claim 9, wherein the data repository is a data file or a data table.

16. A method of analyzing the runtime impact of data files on data extraction, transformation, and loading (ETL) jobs, comprising:
- receiving, via a computer processor, user input from a user, the user input comprising a designator of a data repository;
- querying, via a computer processor, one or more ETL servers for an ETL job list;
- receiving, via a computer processor, an ETL job list file from the one or more ETL servers, wherein the ETL job list file comprises a list of a plurality of ETL job invocation names, wherein the ETL job list file received from the one or more ETL servers lists a plurality of ETL jobs;
- determining, via a computer processor, whether each ETL job listed in the ETL job list file is valid;
- for each ETL job determined to be invalid, removing, via a computer processor, the ETL job from the ETL job list file;
- determining, via a computer processor, whether each ETL job listed in the ETL job list file has multiple invocations;
- for each ETL job listed in the ETL job list file that has multiple invocations, listing, via a computer processor, each invocation of the ETL job in the ETL job list file thereby creating the list of the plurality of ETL job invocation names;
- for each ETL job invocation name in the ETL job list file:
  - querying, via a computer processor, the one or more ETL servers for runtime information related to the ETL job invocation name;
  - receiving, via a computer processor, the runtime information related to the ETL job invocation name from the one or more ETL servers;
  - searching, via a computer processor, the runtime information related to the ETL job invocation name for the designator of the data repository received from the user; and
  - if the designator of the data repository is identified in the runtime information, adding, via a computer processor, the ETL job invocation name to an impacted ETL job file; and
- providing, via a computer processor, the impacted ETL job file to the user, wherein the impacted ETL job file comprises a list of all ETL job invocations from the ETL job list file that use, during runtime, the data repository received from the user.

17. The method according to claim 16, comprising:
- determining whether the user input is valid; and
- querying the one or more ETL servers for the ETL job list in response to determining that the user input is valid.

18. The method according to claim 16, wherein determining whether each ETL job listed in the ETL job list file is valid comprises:
- querying the one or more ETL servers for job status information related to each ETL job listed in the ETL job list file;
- receiving the job status information; and
- based on the job status information, determining whether each ETL job listed in the ETL job list file is valid.

19. The method according to claim 16, wherein, for each ETL job listed in the ETL job list file that has multiple invocations, listing each invocation of the ETL job in the ETL job list file comprises replacing a name of the ETL job with a name of each invocation of the ETL job.

20. The method according to claim 16, wherein the list of the plurality of ETL job invocation names comprises:
- for each ETL job listed in the ETL job list file that has multiple invocations, a name of each invocation of the ETL job; and
- for each ETL job listed in the ETL job list file that does not have multiple invocations, a name of the ETL job.

* * * * *